(12) United States Patent
Homme et al.

(10) Patent No.: US 7,019,303 B2
(45) Date of Patent: Mar. 28, 2006

(54) RADIATION RAY DETECTOR AND METHOD OF MANUFACTURING THE DETECTOR

(75) Inventors: Takuya Homme, Hamamatsu (JP); Toshio Takabayashi, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 91 days.

(21) Appl. No.: 10/343,438

(22) PCT Filed: Aug. 3, 2001

(86) PCT No.: PCT/JP01/06700

§ 371 (c)(1),
(2), (4) Date: May 21, 2003

(87) PCT Pub. No.: WO02/12919

PCT Pub. Date: Feb. 14, 2002

(65) Prior Publication Data

US 2003/0173493 A1 Sep. 18, 2003

(30) Foreign Application Priority Data

Aug. 3, 2000 (JP) .............................. 2000-235874

(51) Int. Cl.
*G01T 1/20* (2006.01)
*H01L 31/02* (2006.01)

(52) U.S. Cl. ................................ 250/370.11

(58) Field of Classification Search ............ 250/370.11
See application file for complete search history.

(56) References Cited

U.S. PATENT DOCUMENTS

| 5,912,465 | A  | 6/1999  | Kobayashi et al. |
| 6,262,422 | B1 | 7/2001  | Homme et al. |
| 6,278,118 | B1 | 8/2001  | Homme et al. |
| 6,323,891 | B1 | 11/2001 | Kitani et al. ............... 347/263 |
| 6,429,414 | B1 | 8/2002  | Spahn ..................... 250/208.1 |
| 2002/0005489 | A1 | 1/2002 | Kasuyama et al. |

FOREIGN PATENT DOCUMENTS

| EP | 0 762 503 A2 | 3/1997 |
| EP | 0 903 590 A1 | 3/1999 |
| EP | 0 932 053 A1 | 7/1999 |
| EP | 0 997 949 A2 | 5/2000 |
| JP | 1-114780 | 5/1989 |
| JP | 7-209430 | 8/1995 |
| JP | 9-153606 | 6/1997 |
| JP | 2000-9845 | 1/2000 |
| JP | 2000-131444 | 5/2000 |
| WO | 00/36436 | 6/2000 |

*Primary Examiner*—Constantine Hannaher
(74) *Attorney, Agent, or Firm*—Drinker Biddle & Reath LLP

(57) ABSTRACT

The light receiving sections of solid-state image sensing devices (2a and 2b) are disposed on a base (1) to adjoin each other, and are fixed with an adhesive resin (11). A transparent film (3) is formed on the light receiving sections so as to wholly cover a gap (25) and have a flat surface on which a layer of a scintillator (4) is formed.

9 Claims, 8 Drawing Sheets

RADIATION RAY DETECTOR AND METHOD OF MANUFACTURING THE DETECTOR

TECHNICAL FIELD

This invention relates to a radiation detector, and, more particularly, to a radiation detector constructed by arranging a plurality of image sensors so as to take a radiation image having a large area, and relates to a method for manufacturing the radiation detector.

BACKGROUND ART

An X-ray image sensor using a CCD, in place of an X-ray photosensitive film, has been widely employed as an X-ray diagnostic instrument for medical use. In such a radiation imaging system, two-dimensional image data by radiation is obtained as an electrical signal by use of a radiation detector that has a plurality of pixels, and an X-ray image is displayed on a monitor by processing the signal with a processor. A typical radiation detector has a configuration in which a scintillator is disposed on photodetectors arranged one-dimensionally or two-dimensionally, and incident radiations are transformed by the scintillator into light, and are detected.

In this type of radiation detector, a yield obtained when manufactured deteriorates proportionately with the enlargement of an image. As a solution to this problem, a technique is known in which a plurality of detecting elements are arranged to enlarge an image when a large-screen imaging device for use in taking a chest X ray, for example, is produced, as disclosed in JP 09-153606A. This publication mentions that the yield of each element is prevented from decreasing, and production costs are reduced by combining the elements of a light receiving screen smaller than an actual imaging screen together.

DISCLOSURE OF THE INVENTION

However, there is a problem that a scintillator is liable to separate from a boundary (a joint) with an adjoining detecting element when a plurality of detecting elements are arranged to make a large screen in this way. This problem causes a concern that the resolution in the vicinity of the joint will decrease or that the scintillator will completely separate therefrom.

It is therefore an object of the present invention to provide a radiation detector constructed so that the durability of a scintillator can be secured, and resolution especially in the vicinity of a joint can be prevented from decreasing, and to provide a method for manufacturing the radiation detector.

In order to achieve the object, the radiation detector according to the present invention is characterized by comprising (1) a plurality of image sensor panels each of which has a substrate and a light receiving section formed by two-dimensionally arranging a plurality of photoelectric detectors on the substrate in the vicinity of at least one side of the substrate, (2) a base on which the light receiving sections of the image sensor panels are arranged to be adjacent to each other, (3) a surface-flat, transparent film integrally covering the whole of the light receiving sections of the plurality of image sensor panels, and (4) a scintillator formed directly on the transparent film. The radiation detector according to the present invention can have a structure in which, for example, two image sensor panels are connected to each other, or four image sensor panels are connected to each other in two-by-two array.

A method for manufacturing the radiation detector according to the present invention is characterized by comprising the steps of (1) preparing a plurality of image sensor panels each of which has a light receiving section formed by two-dimensionally arranging a plurality of photoelectric detectors on a substrate in the vicinity of at least one side of the substrate, (2) arranging the image sensor panels on a base, so that the light receiving sections are adjacent to each other, (3) forming a surface-flat, transparent film generally covering the surface of the whole of the light receiving sections of the image sensor panels, including gaps generated therebetween, and (4) forming a scintillator directly on the transparent film.

Preferably, the scintillator is 100 µm to 1000 µm in thickness.

Preferably, the gap generated between the image sensor panels is 50 µm or less, and the transparent film is 2 µm to 30 µm in thickness. Alternatively, the gap may be 50 µm to 70 µm, and the transparent film maybe 5 µm to 30 µm in thickness.

According to the present invention, a light receiving section that has a large image-pickup area is formed by arranging the light receiving sections of the plurality of image sensor panels so as to adjoin each other. A transparent film is wholly formed on the light receiving sections while flattening the surface thereof, and a scintillator is formed directly on the film, whereby a uniform scintillator can be formed, and a detector having uniform image properties can be obtained. Further, since the scintillator is formed on the flat film, the scintillator can be effectively prevented from separating therefrom.

Preferably, the image sensor panels have a circuit section electrically connected to the photoelectric detectors. Thus, there is no need to form another circuit used to read signals, whereby the device can be easily manufactured, and the handling thereof can be facilitated after the scintillator is formed.

Preferably, a protective film is further provided to cover the scintillator and hermetically seal it. If the scintillator is made of a hygroscopic material or a low-intensity material, the durability thereof can be secured by hermetically sealing it with the protective film.

BEST MODES FOR CARRYING OUT THE INVENTION

Figure 1:
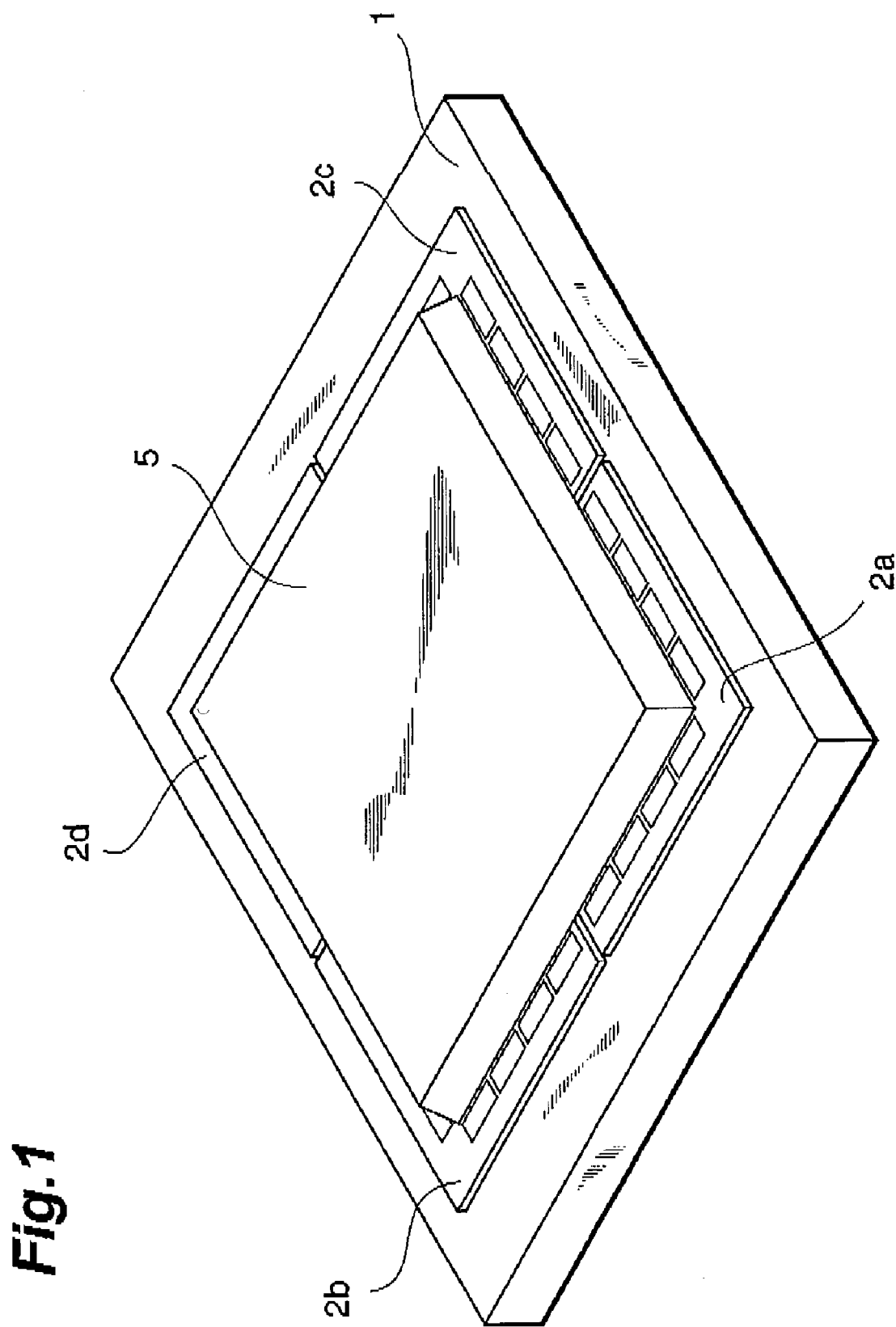
FIG. 1 is a perspective view showing an embodiment of the radiation detector according to the present invention.

Preferred embodiments of the present invention will hereinafter be described in detail with reference to the accompanying drawings. To facilitate the comprehension of the explanation, the same reference numerals denote the same parts, where possible, throughout the drawings, and a repeated explanation will be omitted. Additionally, the size and shape of each component in each drawing are not necessarily the same as the actual ones, and some components are magnified in size and in shape in order to facilitate the understanding thereof.

Figure 2:
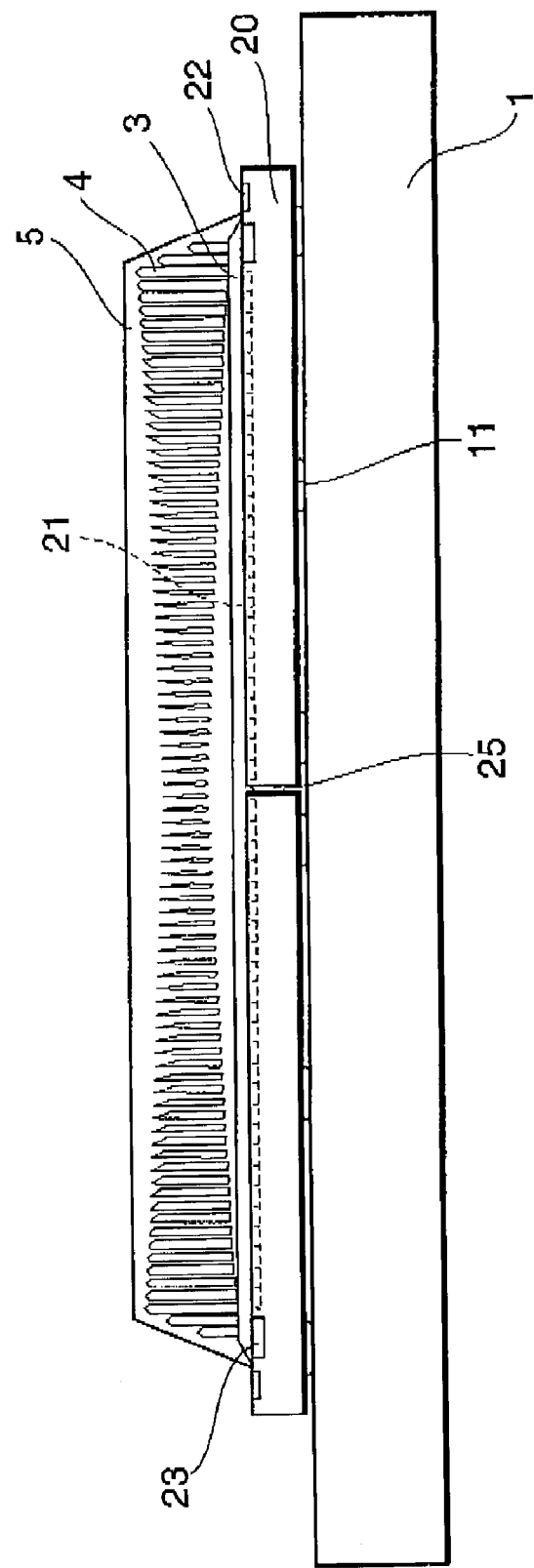
FIG. 2 is a sectional view thereof.
Figure 3:
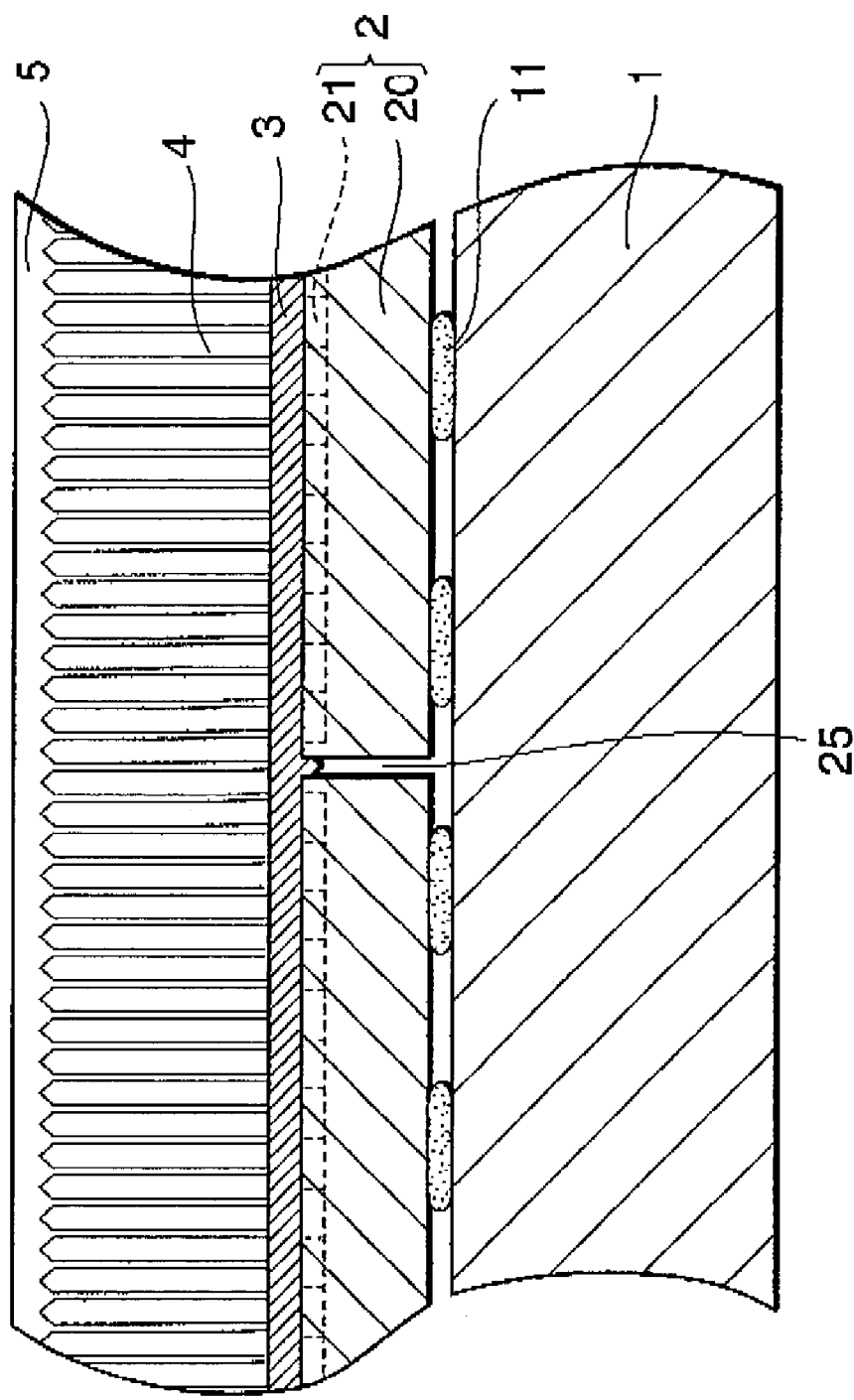
FIG. 3 is a partially enlarged view of FIG. 2.

FIG. 1 is a perspective view showing an embodiment of the radiation detector according to the present invention, FIG. 2 is a sectional view thereof, and FIG. 3 is a partially enlarged view of FIG. 2. The radiation detector 100 in this embodiment is formed by disposing solid-state image sensing devices 2a to 2d, which are four image sensor panels, in 2×2 array on a ceramic base 1. Each of the solid-state image sensing devices 2a to 2d is fixed to the base 1 with an adhesive resin 11.

Each solid-state image sensing device 2 is constructed by two-dimensionally arranging photoelectric detectors 21 that perform a photoelectric conversion on a substrate 20 made of, for example, crystalline Si. The photoelectric detectors 21 are formed out of photodiodes (PD) or transistors. The part where the photoelectric detectors 21 are arranged is hereinafter referred to as a light receiving section. Each photoelectric detector 21 is electrically connected by a signal line, not shown, to a corresponding electrode pad 22 of electrode pads 22 disposed along two adjoining sides of the solid-state image sensing device 2 through a shift register 23. The solid-state image sensing devices 2a to 2d are arranged so that the light receiving sections adjoin each other, in other words, so that the electrode pads 22 occupy a peripheral part. This arrangement makes it possible to dispose the light receiving sections of the solid-state image sensing devices 2 as close to each other as possible. Further, an insensible field that cannot obtain an image can be narrowed by making the gap between the light receiving sections as small as possible.

A transparent film 3 that is transparent to light of a wavelength range to which the photoelectric detector 21 is sensitive is formed on the solid-state image sensing devices 2a to 2d so as to wholly cover a gap 25 adjoining the light receiving sections and between the light receiving sections. Preferably, a resin superior in surface smoothness and excellent in light transmission characteristics, such as a polyimide resin, is used as the transparent film 3. A columnar scintillator 4 by which incident radiation is transformed into light of a wavelength range to which the photoelectric detector 21 is sensitive is formed on the transparent film 3. Various materials can be used as the scintillator 4, and, for example, CsI doped with T1 that is superior in luminous efficiency is preferable.

Further, a protective film 5 is formed with which the scintillator 4 is covered, which extends to the part between the electrode pad 22 of each solid-state image sensing device 2 and the shift register 23, and with which the scintillator 4 is hermetically sealed The protective film 5 is radiolucent and is impermeable to water vapor, and, for this film, it is preferable to use, for example, a poly-para-xylylene resin (manufactured by Three Bond Co., Ltd.; registered by Parylene), especially poly-para-chloroxylylene (manufactured by the same company; registered by Parylene C). A coating film of Parylene has excellent properties suitable as the protective film 5, because it is extremely small in water permeability to water vapor and gas, is superior in water repellency and in chemical resistance, is excellent in electric insulation regardless of its thinness, and is transparent to radiation and visible rays.

Figure 4:
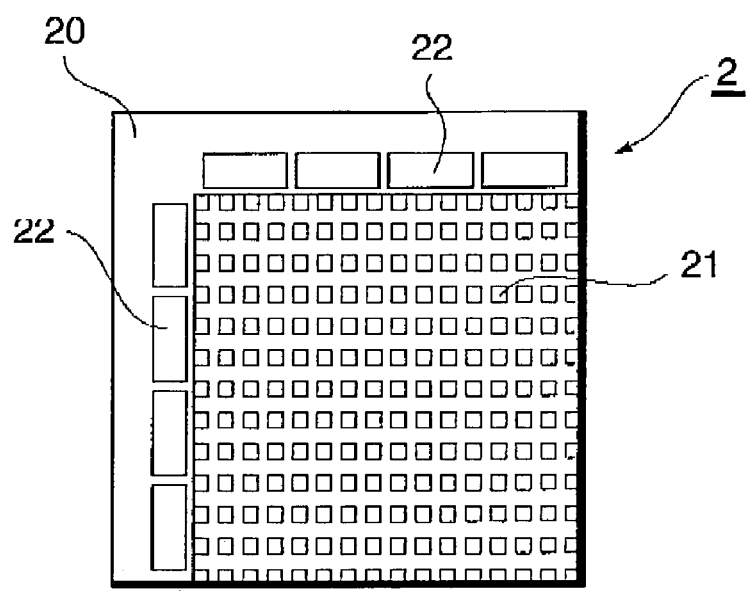
FIG. 4 to FIG. 8 are views for explaining steps of manufacturing the detector of FIG. 1, i.e., a method for manufacturing the radiation detector according to the present invention.
Figure 5:
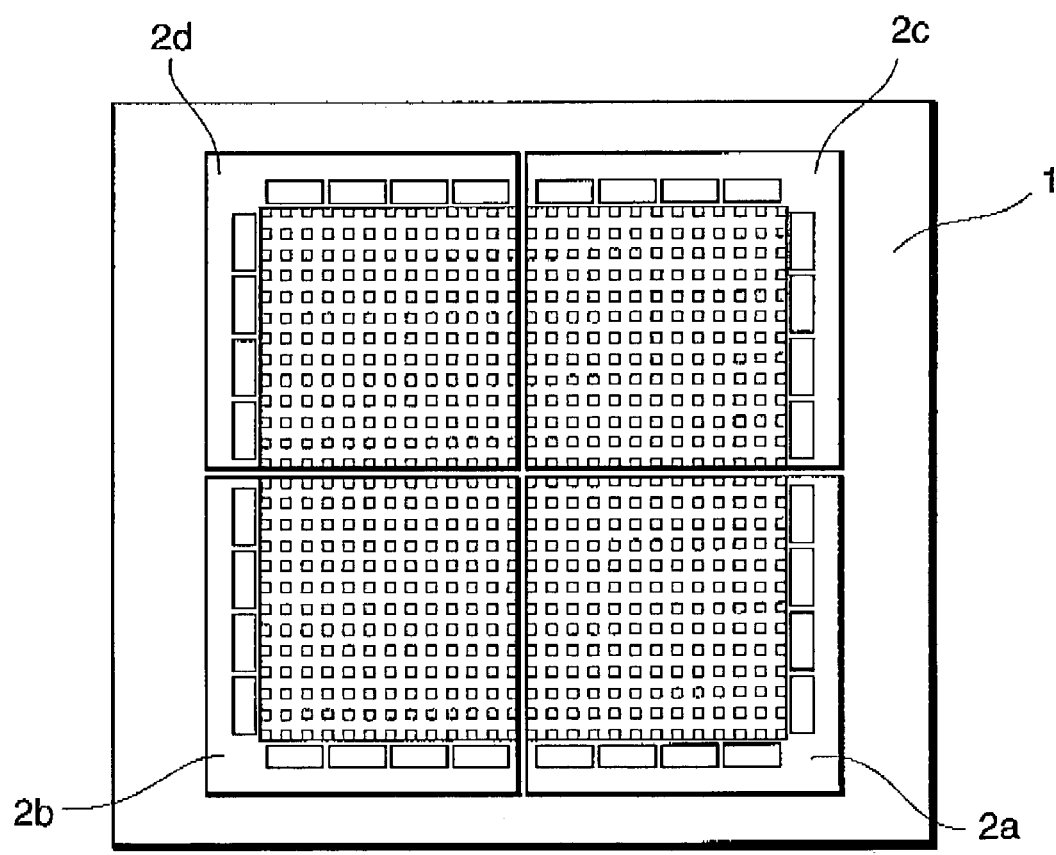

Next, referring to FIGS. 4 to 8, a detailed description will be given of steps of manufacturing the radiation detector, i.e., a method for manufacturing the radiation detector according to the present invention. Four solid-state image sensing devices 2 structured as shown in FIG. 4 are first prepared. Thereafter, the solid-state image sensing devices 2a to 2d are arranged in two-by-two array on the surface of the base 1 having a flat surface, with the light receiving surface of the photoelectric detector 21 facing upward, so that the light receiving sections thereof can adjoin each other, in other words, so that electrode pads 22 can be disposed outside, and they are fixed onto the base 1 with an adhesive resin 11 (see FIG. 5).

Figure 6:
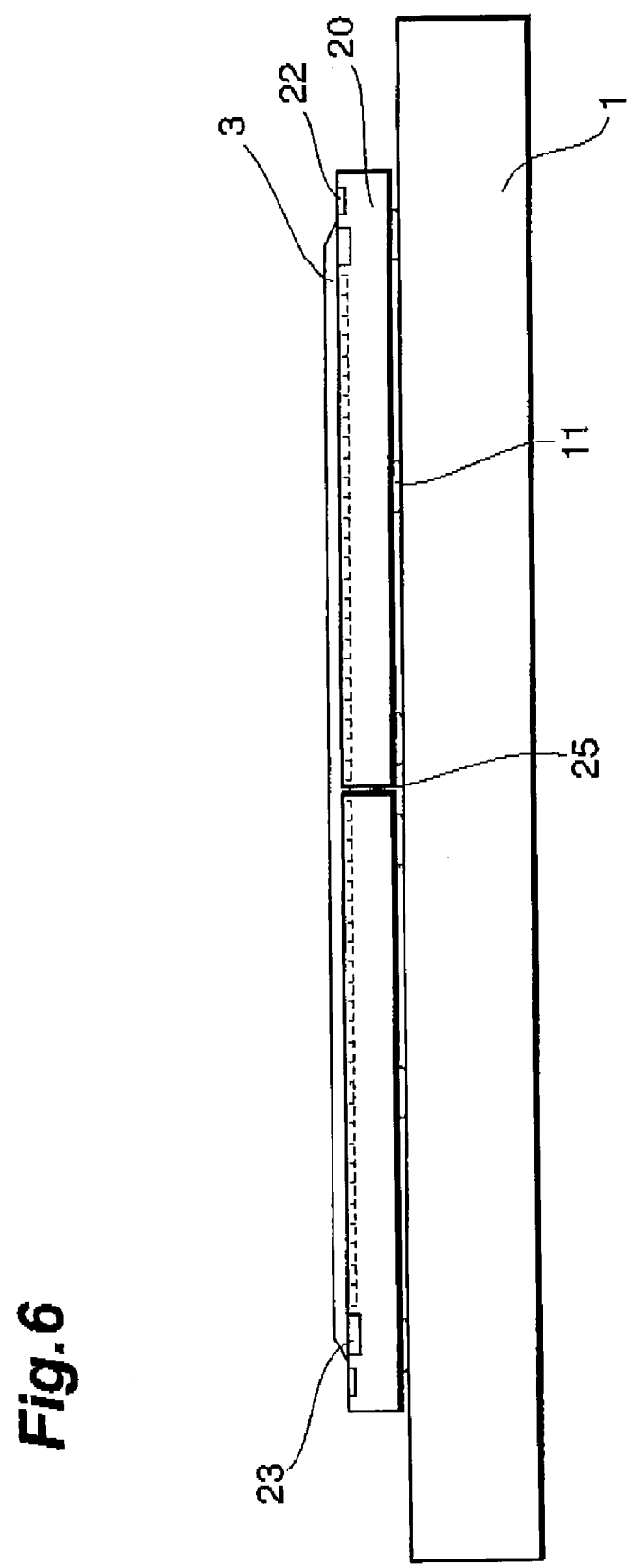

Thereafter, polyimide is applied onto the entire light receiving section (including the gap 25 generated therebetween) while masking the part of the electrode pads 22, and is hardened, thereby forming the transparent film 3 having a thickness of about 5 μm (see FIG. 6). Thus, the gap between the solid-state image sensing devices 2a to 2d is closed with the transparent film 3, and, even when there is a difference in level between the surface positions of the elements, the surface of the transparent film 3 can be smoothly formed.

Figure 7:
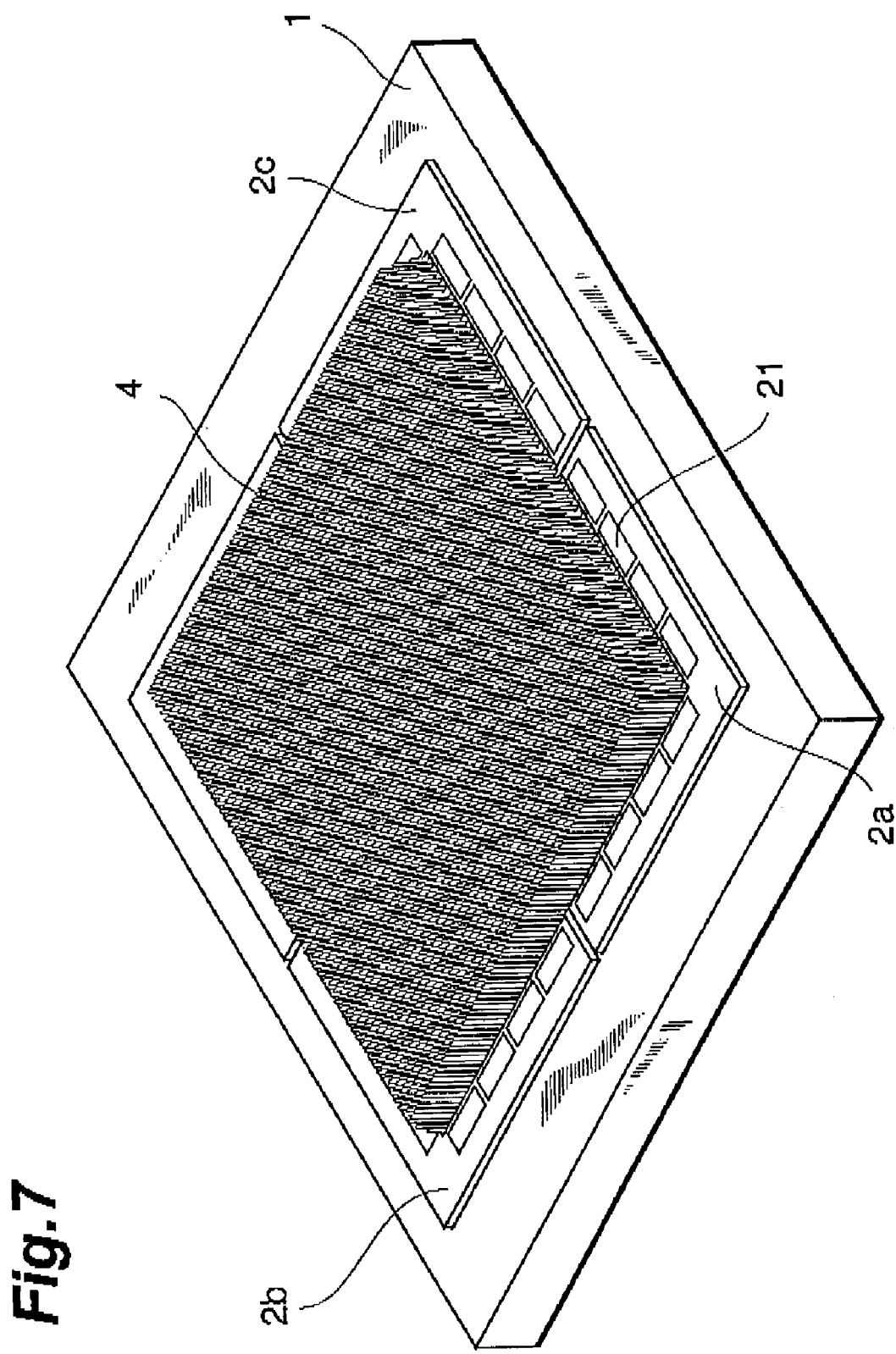

Thereafter, CsI doped with T1 is grown as a columnar crystal of about 400 μm in thickness on the thus structured transparent film 3 according to the vacuum deposition method, whereby the layer of the scintillator 4 is formed (see FIG. 7). As a result, the layer of the scintillator 4 is formed on the whole light receiving sections of the solid-state image sensing devices 4a to 4d. Since the surface of the transparent film 3 that serves as a base where the layer of the scintillator 4 is formed is smooth as mentioned above, a uniform layer of the scintillator 4 can be formed over the entire light receiving sections including the gap therebetween.

Figure 8:
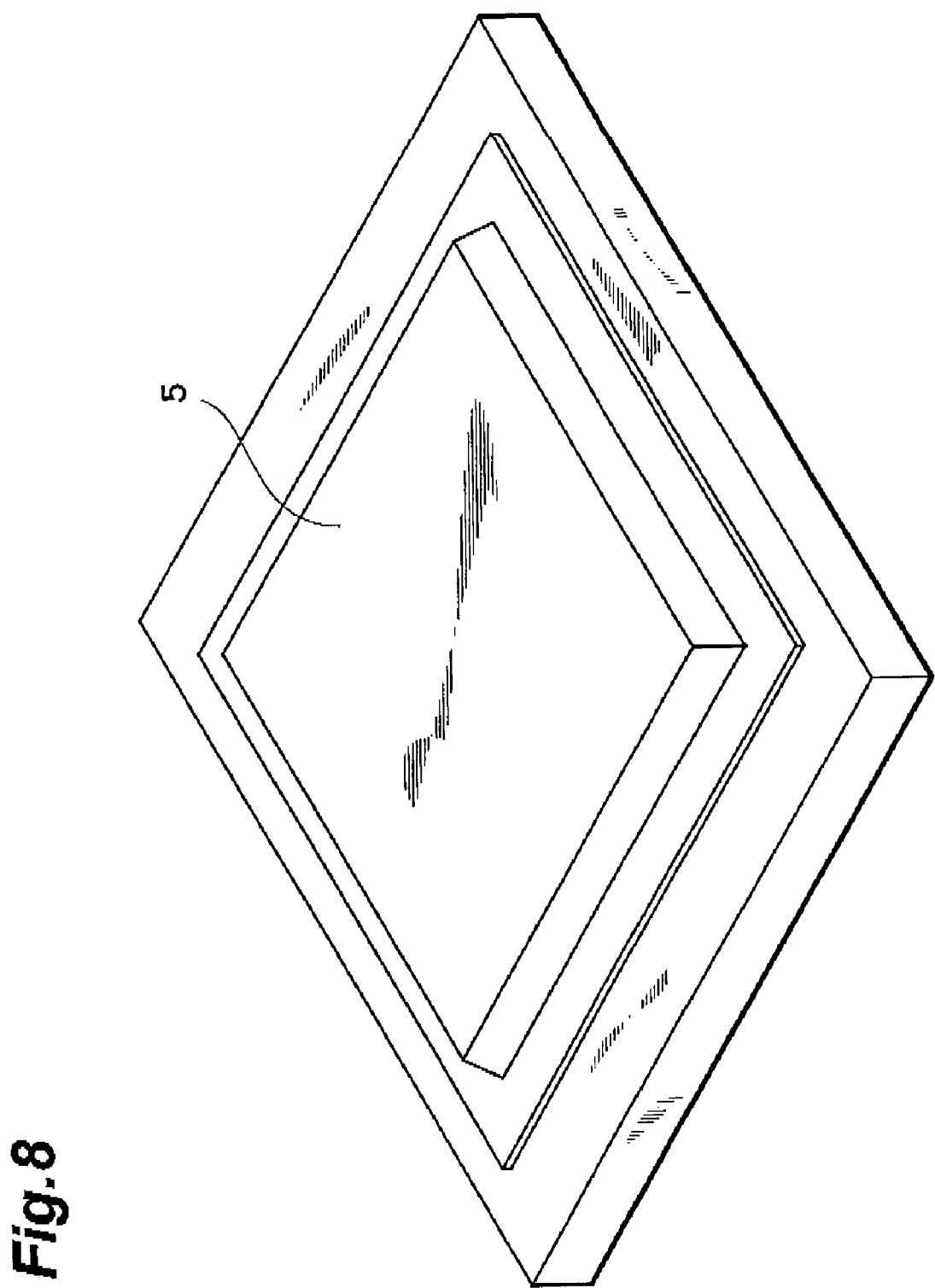

CsI has high hygroscopicity and will be dissolved while absorbing the water vapor of the air if it remains exposed, and therefore, for its protection, the whole of the solid-state image sensing devices 2a to 2d where the scintillator 4 is formed is wrapped together with the base 1 with 10 μm-thick Parylene according to the CVD (chemical vapor deposition) method, and the protective film 5 is formed (see FIG. 8).

In greater detail, coating by vapor deposition is performed in a vacuum in the same way as the vacuum deposition of metal, and includes a step of subjecting a diparaxylylene monomer used as a raw material to thermal decomposition, then quickly cooling a resulting product in an organic solvent such as toluene or benzene, and obtaining diparaxylylene which is called diner, a step of subjecting this diner to thermal decomposition and gathering a stable radical paraxylylene gas, and a step of causing the thus generated gas to be absorbed and polymerized onto a material so as to form a polyparaxylylene film having a molecular weight of about 500,000 by polymerization.

There is a gap between the columnar crystals of CsI, and Parylene enters this narrow gap to some extent, so that the protective film 5 comes in firm contact with the layer of the scintillator 4 and seals up the scintillator 4. The Parylene coating makes it possible to form a precise thin-film coating, which is uniform in thickness, on the uneven layer surface of the scintillator 4. Under the CVD method, Parylene can be formed at a lower vacuum degree than in metal deposition and at normal temperatures, and can be easily processed.

Thereafter, the protective film 5 is cut along the part between the electrode pad 22 and the shift register 23, and the outer protective film 5 is peeled off so as to expose the electrode pad 22, whereby the radiation detector 100 shown in FIG. 1 to FIG. 3 is obtained.

Next, the operation of this embodiment will he described with reference to FIGS. 1 to 3. X rays (radiation) that have entered from an incidence surface pass through the protective film 5, and reach the scintillator 4. The X rays are absorbed by the scintillator 4, and light of a predetermined wavelength proportional to the quantity of the X rays is emitted. The emitted light passes through the transparent film 3, and reaches the photoelectric detectors 21. In each photoelectric detector 21, an electrical signal corresponding to the quantity of the light that has reached it is generated by a photoelectric conversion, and is stored for a fixed time. Since the quantity of the light is proportional to the quantity of the incident X rays, the electrical signal stored in each photoelectric detector 21 corresponds to the quantity of the incident X rays, and an image signal corresponding to an X-ray image can be obtained. The image signals stored in the photoelectric detectors 21 are successively output from each electrode pads 22 through the shift register 23 from a signal line not shown, are then transferred outward, and are processed by a predetermined processing circuit, whereby an X-ray image can be displayed on a monitor.

As described above, according to the present invention, the light receiving sections of the solid-state image sensing devices 2 can be disposed to adjoin each other, and, since the uniform layer of the scintillator 4 is formed on the surface of the light receiving sections, an insensible field generated at a joint between the light receiving sections can be narrowed, and a deterioration in resolution can be prevented. Further, since the light receiving sections, including the joint therebetween, are covered with the transparent film 3 on which the scintillator 4 is formed, the scintillator 4 can be effectively prevented from separating therefrom, and the durability thereof can be secured. Further, since small elements of the light receiving screen are combined together, the yield for each element can be prevented from decreasing greater than a case where large-screen elements are manufactured, and production costs can be reduced.

In order to verify the effects that the separation of the scintillator 4 is prevented by filling the gap between the elements with the transparent film 3, the present inventors prepared four kinds of pairs of solid-state image sensing devices, and arranged the elements so that the gap between the elements depends on positions to be occupied by disposing them so that a gap therebetween is smaller or larger than another gap. The present inventors then applied polyimide onto the surface of each pair of elements and hardened it so that each pair forms a transparent film having a predetermined thickness. Thereafter, the present inventors deposited CsI of 400 µm as the scintillator 4, and examined whether the scintillator 4 at a boundary was separated or not. Table 1 shows the result.

TABLE 1

| | Presence off scintillator separation | | | | |
| --- | --- | --- | --- | --- | --- |
| | Gap | | | | |
| Thickness | 10 µm | 30 µm | 50 µm | 70 µm | 100 µm |
| 1 µm | Separated | Separated | Separated | Separated | Separated |
| 2 µm | Not separated | Not separated | Not separated | Separated | Separated |
| 5 µm | Not separated | Not separated | Not separated | Not separated | Separated |
| 8 µm | Not separated | Not separated | Not separated | Not separated | Separated |

It was ascertained that the scintillator 4 can be deposited without separation by forming a 5 µm-thick transparent film even when the gap is 70 µm.

From this result, the separation of the scintillator can be prevented by setting the thickness of the transparent film at 2 µm or more when the gap is 50 µm or less, and setting the thickness thereof at 5 µm or more when the gap is between 50 µm and 70 µm. Preferably, the thickness of the transparent film is 30 µm or less since an excessively thick transparent film causes the scattering of an image in the transparent film and reduces its resolution.

If the gap reaches a great thickness of 100 µm, the amount of transparent film that has entered the gap increases, and the transparent film produces a slight hollow part in the gap because of a shrinkage caused when the transparent film is hardened, and, accordingly, the scintillator is separated. Additionally, since a dead space will increase proportionately with the enlargement of the gap, as small a gap as possible is desirable. From this fact, it is preferable to control the gap to be 70 µm or less.

It is to be noted that the relationship between the size of the gap and the thickness of the transparent film is satisfied by a scintillator falling within the range of 100 µm to 1000 µm in thickness.

Figure 9:
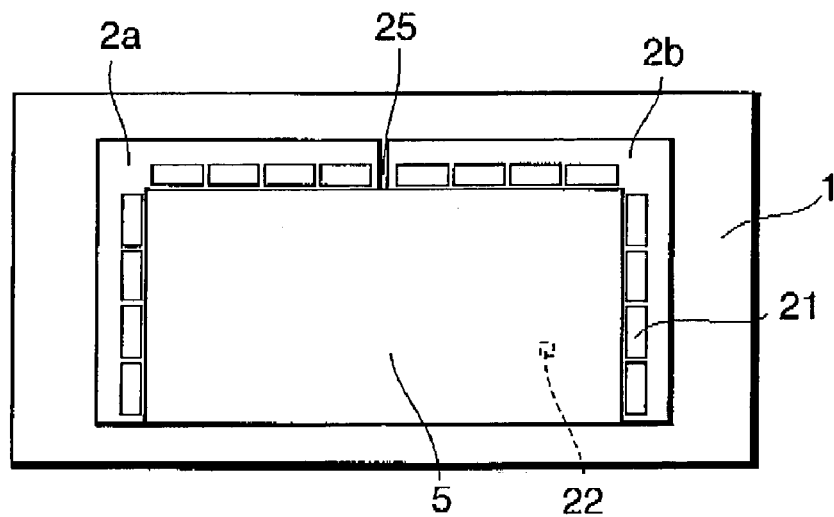
FIG. 9 is a plan view showing another embodiment of the radiation detector according to the present invention.
Figure 10:
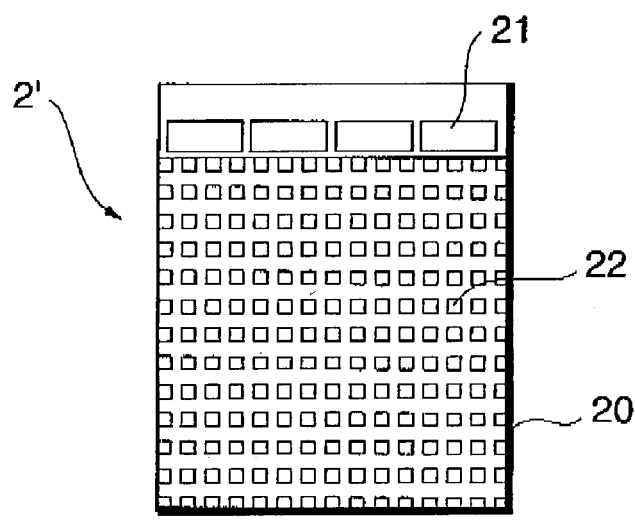
FIG. 10 and FIG. 11 are plan views, each showing an image sensor panel used in another embodiment of the radiation detector according to the present invention.
Figure 11:
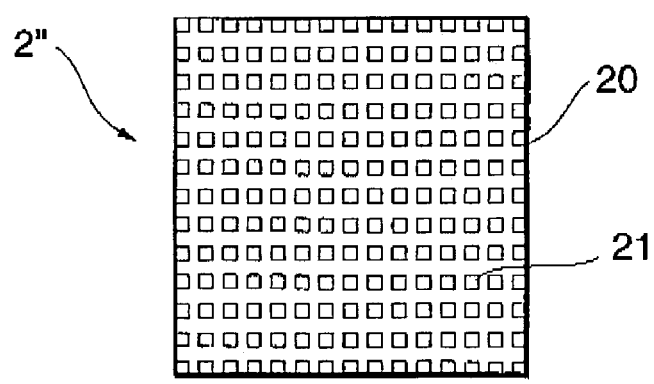

FIG. 9 is a plan view showing a second embodiment of the radiation detector according to the present invention. As shown in this figure, the solid-state image sensing devices 2a and 2b that are two image sensor panels may be coupled together to manufacture a radiation detector with a large screen. Further, it is allowable to arrange three Or more solid-state image sensing devices in a row so as to make a large screen or arrange them in 2×m array or in m×n array for a large screen. If the solid-state image sensing devices are arranged in 2×m array (where m is 3 or an integer greater than 3), solid-state image sensing devices 2' other than the image pickup elements disposed at at least four corners are required to have a structure (see FIG. 10) in which the light receiving section 21 is disposed up to the boundary of at least three sides. Additionally, if the solid-state image sensing devices are arranged in m×n array (where m and n are each an integer of 3 or more), solid-state image sensing devices 2" to be disposed other than at the peripheral part are required to have a structure in which the light receiving section 21 is placed on its entire surface (see FIG. 11). In this situation, it is preferable to dispose the electrode pad on the back face and read signals by use of a wire passing through the base 1.

In the foregoing description, the protective film 5 is a Parylene-made protective film having a single film structure. However, if a reflection film that is a thin film made of metal, such as Al, Ag, or Au, is placed on the surface of the Parylene-made film, an image with high brightness can be obtained by returning the light emitted from the scintillator 4 to the photoelectric detector 21. A Parylene film, for example, maybe applied onto the surface of the metallic thin film for the protection of the metallic one. When a moisture-proof material is used as the scintillator 4 or when the whole of the device is contained in a moisture-proof protective case, the protective film 5 is not needed.

The transparent film in the present invention does not mean a transparent film in the sense of transmitting a visible ray of light, but means that the transparent film has the transmission properties of light to which the photoelectric detector of the image sensor panel on which the transparent film is disposed is sensitive. Therefore, when use is made of, for example, a photoelectric detector sensitive to a specific wavelength range of visible light, the film is allowed to be nontransparent to visible light outside the sensible range, and, when use is made of a photoelectric detector sensitive not to visible light but to infrared rays, ultraviolet rays, etc., the film is allowed to be nontransparent to visible light if sensible light is transmitted. The film is further allowed to be nontransparent to part of a sensible range.

INDUSTRIAL APPLICABILITY

The radiation detector according to the present invention can be suitably used as a radiation detector that take a radiation image for a large screen.

The invention claimed is:

1. A radiation detector comprising:
   a plurality of image sensor panel each of which has a substrate and a light receiving section formed by two-dimensionally arranging a plurality of photoelectric detectors on said substrate in the vicinity of at least one side of said substrate,
   a base on which said light receiving sections of said image sensor panels are arranged to be adjacent to each other,
   a surface-flat, transparent film integrally covering the whole of said light receiving sections of said image sensor panels, and
   a scintillator formed directly on said transparent film,
   wherein a gap generated between said plurality of image sensor panels is 50 µm or less, and said transparent film is 2 µm to 30 µm in thickness.

2. A radiation detector comprising:
   a plurality of image sensor panel each of which has a substrate and a light receiving section formed by two-dimensionally arranging a plurality of photoelectric detectors on said substrate in the vicinity of at least one side of said substrate,
   a base on which said light receiving sections of said image sensor panels are arranged to be adjacent to each other,
   a surface-flat, transparent film integrally covering the whole of said light receiving sections of said image sensor panels, and
   a scintillator formed directly on said transparent film,
   wherein a gap generated between said plurality of image sensor panels is 50 µm to 70 µm, and said transparent film is 5 µm to 30 µm in thickness.

3. The radiation detector according to any one of claims 1 to 2, wherein said image sensor panel has a circuit section electrically connected to said photoelectric detectors.

4. The radiation detector according to any one of claims 1 to 2, wherein the number of said plurality of image sensor panels is two.

5. The radiation detector according to any one of claims 1 to 2, wherein the number of said plurality of image sensor panels is four, and the four image sensor panels are connected to each other in two-by-two array.

6. The radiation detector according to any one of claims 1 to 2, further comprising a protective film covering said scintillator for sealing.

7. A method for manufacturing a radiation detector, the method comprising steps of:
   preparing a plurality of image sensor panels each of which has a light receiving section formed by two-dimensionally arranging a plurality of photoelectric detectors on a substrate in the vicinity of at least one side of the substrate,
   arranging said image sensor panels on a base so that the light receiving sections are adjacent to each other,
   forming a surface-flat, transparent film to integrally cover a surface of the whole of the light receiving sections of the image sensor panels, including gaps generated therebetween, and
   forming a scintillator directly on said transparent film,
   wherein a gap generated between said plurality of image sensor panels is 50 µm or less, and said transparent film is 2 µm to 30 µm in thickness.

8. The method according to claim 7, further comprising a step of forming a protective film covering the scintillator for sealing.

9. A method for manufacturing a radiation detector, the method comprising steps of:
   preparing a plurality of image sensor panels each of which has a light receiving section formed by two-dimensionally arranging a plurality of photoelectric detectors on a substrate in the vicinity of at least one side of the substrate,
   arranging said image sensor panels on a base so that the light receiving sections are adjacent to each other,
   forming a surface-flat, transparent film to integrally cover a surface of the whole of the light receiving sections of the image sensor panels, including gaps generated therebetween, and
   forming a scintillator directly on said transparent film,
   wherein a gap generated between said plurality of image sensor panels is 50 µm to 70 µm, and said transparent film is 5 µm to 30 µm in thickness.

* * * * *